(12) United States Patent
Yang et al.

(10) Patent No.: US 6,785,321 B1
(45) Date of Patent: Aug. 31, 2004

(54) APPARATUS AND METHOD FOR ESTIMATING THE TIME OF ARRIVAL OF A SPREAD SPECTRUM SIGNAL IN A WIRELESS COMMUNICATION SYSTEM

(75) Inventors: Roy Yang, Buffalo Grove, IL (US); Jiangnan Jason Chen, Darien, IL (US)

(73) Assignee: Motorola, Inc., Schaumburg, IL (US)

( * ) Notice: Subject to any disclaimer, the term of this patent is extended or adjusted under 35 U.S.C. 154(b) by 760 days.

(21) Appl. No.: 09/703,051

(22) Filed: Oct. 31, 2000

(51) Int. Cl.[7] .............................................. H04B 7/185
(52) U.S. Cl. ..................... 375/137; 375/150; 375/367; 375/343; 342/357.01; 342/357.14; 342/465
(58) Field of Search ................................ 375/150, 137, 375/367, 343; 370/350, 479; 342/357.01, 357.14, 465

(56) References Cited

U.S. PATENT DOCUMENTS

| | | | | |
|---|---|---|---|---|
| 4,644,523 A | * | 2/1987 | Horwitz ....................... | 370/479 |
| 5,970,084 A | * | 10/1999 | Honda ........................ | 375/147 |
| 6,141,337 A | * | 10/2000 | Uta et al. .................... | 370/350 |
| 6,154,487 A | * | 11/2000 | Murai et al. ................. | 375/150 |
| 6,157,842 A | * | 12/2000 | Karlsson et al. ......... | 455/456.2 |
| 6,226,317 B1 | * | 5/2001 | Bruckert et al. ............ | 375/146 |
| 6,330,271 B1 | * | 12/2001 | Klang et al. ................. | 375/134 |
| 6,628,699 B2 | * | 9/2003 | Ramberg et al. ............ | 375/148 |
| 6,677,895 B1 | * | 1/2004 | Holt ........................ | 342/357.1 |

* cited by examiner

Primary Examiner—Stephen Chin
Assistant Examiner—Sudhanshu C. Pathak (57) ABSTRACT

A threshold tracking loop (TTL) (400) for detecting the time of arrival of a spread spectrum wireless communication signal includes a pseudo-noise (PN) generator (440) for generating a receive PN code for use in spread spectrum decoding and a series of time delay units (401–408) for adjusting a phase offset of the PN code. A first PN despreader (423) is coupled to the time delay units and PN generator for despreading an early pilot signal (413). A second despreader (425) is coupled to the time delay units and PN generator for despreading a late pilot signal (415). A first comparison circuit (443) is coupled to the first PN despreader for comparing a signal value of the early pilot signal with a preselected threshold value (322) and for advancing the PN code phase offset if the early signal value is greater than the threshold value. A second comparison circuit (445) is coupled to the second PN despreader for comparing a signal value of the late pilot signal with the preselected threshold value and for retarding the PN code phase offset if the late signal value is less than the threshold value. The TTL is completed by a loop filter coupled to the PN generator and the first and second comparison circuits.

21 Claims, 6 Drawing Sheets

APPARATUS AND METHOD FOR ESTIMATING THE TIME OF ARRIVAL OF A SPREAD SPECTRUM SIGNAL IN A WIRELESS COMMUNICATION SYSTEM

FIELD OF THE INVENTION

The present invention relates to cellular communications systems and, more particularly, to a method and apparatus for estimating the time of arrival of a spread spectrum signal in a wireless communication system.

BACKGROUND OF THE INVENTION

Location determination and tracking of a remote or mobile unit within a wireless communication system, such as a code division multiple access (CDMA) system, has many applications, including emergency, e.g., 911, services for wireless telephone subscribers, location sensitive billing, fleet management, and so forth. It is well known that the distance of a mobile unit from a base station can be determined by analyzing the propagation delay, or time of flight, of a signal transmitted from the mobile unit to the base station, or vice versa. Likewise, the location of a mobile unit within a wireless communication system can be determined using a trilateration method, such as time of arrival (TOA) and time difference of arrival (TDOA) techniques. According to such a methods, distances between the mobile unit and multiple, e.g., three, base stations are calculated based on a measurement of time delay of a signal traveling between the mobile unit and each base station. When determining the location of a mobile unit is desired, a signal transmitted from the mobile unit to multiple base stations. The time of arrival (TOA) is estimated at each base station, and TOA or TDOA locating techniques are used to analyze the propagation delay differences and calculate a distance from each base station to the mobile unit. Since the location of the each base station is precisely known, the location of the mobile unit can be determined. Also, the propagation delay for a single base station can be used to determine or track the distance of a mobile unit from the base station. TOA information for a single base station can also be combined with angle of arrival information to determine location.

The effects of a radio channel upon the correlation result of a CDMA signal transmitted thereon can result in a delay spread of about 10–15 $\mu$s. Such effects are well known and include phase error, fading, multi-path propagation, motion effect (Doppler shift, multi-path dynamics), and so forth. Any location estimation scheme generally involves the estimation of the TOA of the leading ray. The mobile unit uses the leading finger's position to estimate the distance to the base station, whereas the base station uses the round trip delay information to locate the mobile unit. The leading finger uses its delay locked loop (DLL) element to track the peak energy signal.

The drawback of DLL peak tracking for TOA estimation, however, is that the time at which the peak energy is located does not always accurately represent the TOA of the signal. This is because the TOA is defined as the arrival time of the leading edge of the signal. On average, the use of peak energy location for arrival time estimation results in an error of about 300–400 ns with high signal strength in IS-95 based systems, thus causing error in location estimation.

Prior art techniques for enhancing accuracy of estimation of the arrival time of the leading ray include using separate circuitry to search in front of the leading finger position to find the prompt ray for angle of arrival estimation, or, using a bank of correlators before the peak energy location and watching the energy readings out of the correlator array. However, both techniques demand extensive additional circuitry, making them more costly to implement. Also, since such techniques require accumulation of data over time, it is very difficult to use such techniques for tracking the position of a mobile unit in real time.

A need therefore exists for an improved tracking apparatus and method providing enhanced TOA estimation for locating mobile units in a wireless communication system.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE PREFERRED EMBODIMENTS

The present invention provides an improved time of arrival (TOA) estimation apparatus and method which overcome the above-referenced problems and others. The present invention provides a threshold tracking loop (TTL) apparatus and a method employing the same to provide improved TOA estimation and, thus, improved location estimation of a mobile device such as a radiotelephone.

Figure 1:
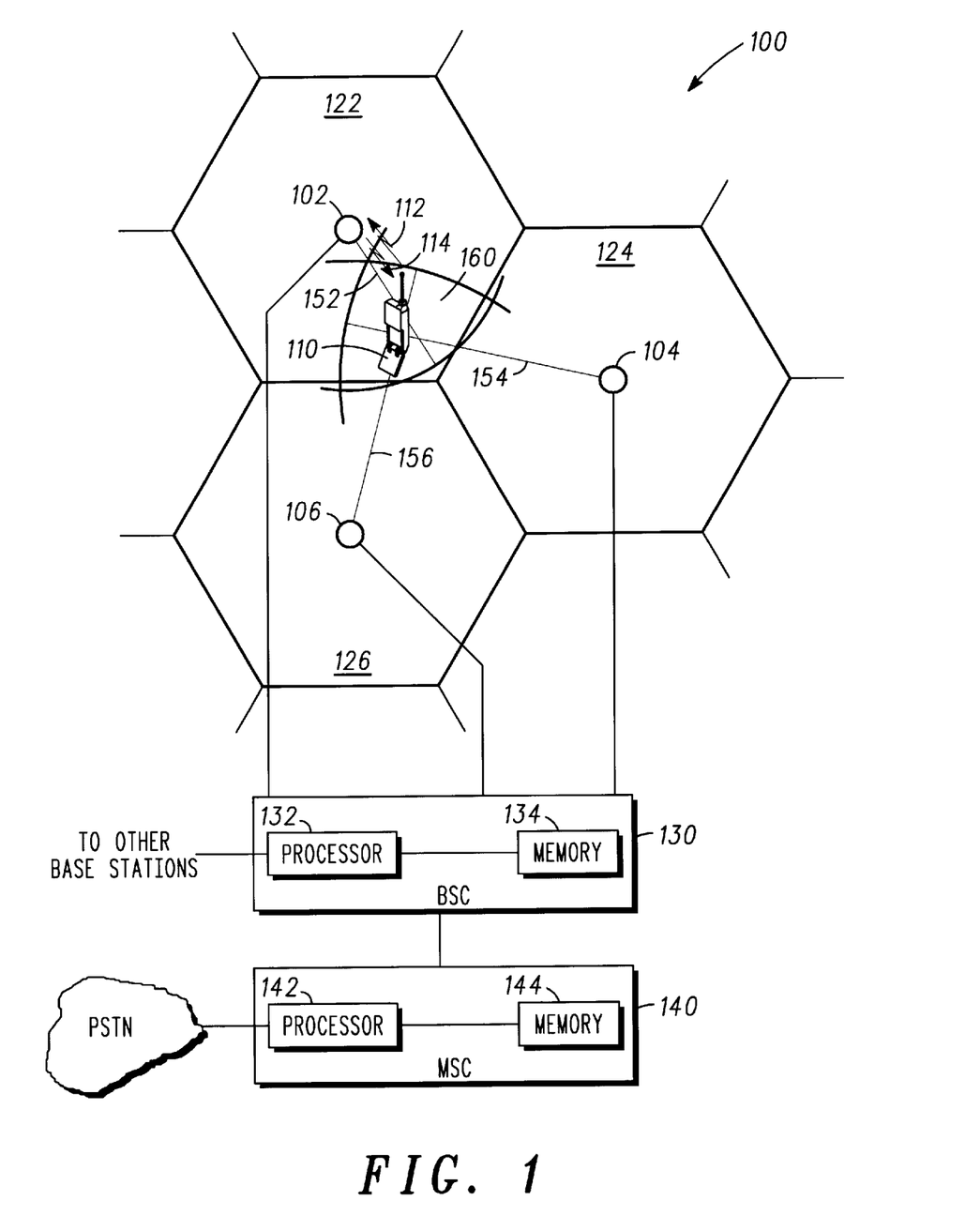
FIG. 1 is a simplified diagram illustrating an exemplary cellular system of a type which may employ the present invention.

Referring to FIG. 1, a spread spectrum wireless communication system, such as a CDMA digital radiotelephone system is provided, is generally depicted as 100. Base stations 102, 104, and 106 communicate with a mobile device 110 operating within coverage areas 122, 124, and 126 served by base stations 102, 104, and 106, respectively. Base stations have fixed locations chosen to provide generally overlapping coverage areas, typically providing a hexagonal cell pattern. Auxiliary base stations (not shown) may also located between bases 102, 104, and 106.

Base stations 102, 104, and 106 are coupled to a base station controller (BSC) 130, which includes, among other things, a processor 132 and a memory 134. BSC 130 is coupled to a mobile switching center (MSC) 140, also including, among other things, a processor 142 and a memory 144. The BSC and MSC operate according to well-known methods and are commercially available from Motorola, Inc.

Multiple access wireless communication between base stations 102, 104, 106 and mobile device 110 occurs via radio frequency (RF) channels over which digital communication signals such as voice, data, and video are transmitted. Base-to-mobile device communications are said to occur on a forward-link channel 112, while mobile-to-base communications are referred to as being on a reverse-link channel 114. A preferred communication system operable to embody the present invention is a CDMA system implementing industry promulgated or adopted standards. Such standards include, for example, digital-based cellular standards such as the Telecommunications Industry Association/Electronic Industries Association (TIA/EIA) Interim Standard IS-95 series including IS-95A and IS-95B, entitled "Mobile Station-Base Station Compatibility Standard for Dual-Mode Wideband Spread Spectrum Cellular System" (hereinafter referred to as "IS-95"), and digital-based PCS standards such as the American National Standards Institute (ANSI) J-STD-008 series, entitled "Personal Station-Base Station Compatibility Requirements for 1.8 to 2.0 GHz Code Division Multiple Access (CDMA) Personal Communication Systems."

As shown in FIG. 1, a communication signal 112 is transmitted on a forward-link channel, such as an IS-95 channel. Signal 112 may be, for example, a paging channel or traffic channel from a source base station, such as base station 102, to mobile device 110. Alternatively, a communication signal 114 may be transmitted via a reverse link, such as an IS-95 reverse-link channel, such as an access channel or a traffic channel by mobile device 110 to its source base station 102. For location determination, mobile device 110 may receive and/or transmit communication signals with other base stations, such as base stations 104 and 106.

The distance between bases 102, 104, and 106 and the mobile unit 110 is estimated using a location calculator employing standard TOA or TDOA techniques, the calculations incorporating the improved time of arrival estimates in accordance with this teaching. The location calculator may be implemented in processing circuitry located at any convenient location on the network, such as in processing circuitry of one or more of the base stations 102, 104, and 106, processor 132 of base station controller 130, processor 142 of mobile switching center 140, or other centralized location. Specifically, the time of arrival is estimated by determining the time at which the signal energy of the leading edge of an arriving signal reaches a certain threshold above the noise floor. Exemplary distance estimates 152, 154, and 156 from base stations 122, 124, and 126, respectively, yield a generally triangular region 160 within which the mobile unit location is estimated to fall within. By providing an increased accuracy of the TOA, the present invention provides an improved estimate of the distance from each base station, thus yielding an estimate much closer to the true location of the mobile unit, i.e., a much smaller triangular region 160, than is provided using peak tracking.

When the time of arrival of a signal from one or more base stations to a mobile unit is estimated by TTL circuitry within the mobile unit (mobile assisted location scheme) the TOA is then reported back to the base station(s). In a network based location scheme, the base station uses its own leading finger and TTL circuitry to estimate the round trip delay to the mobile unit.

Figure 2:
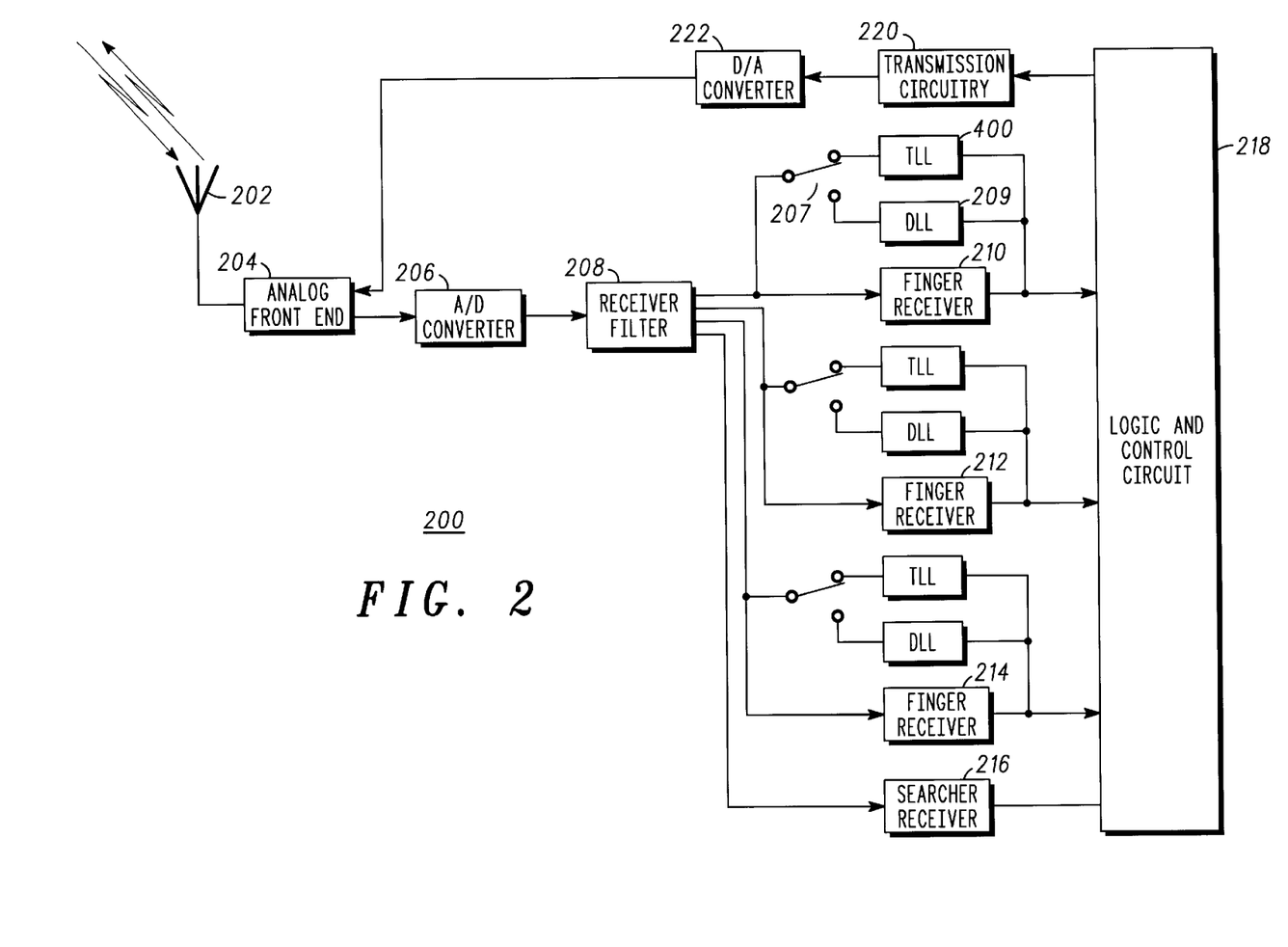
FIG. 2 is a block diagram of a wireless communication device employing the present invention.

Referring now to FIG. 2, an electrical block diagram of the receiver portion of a wireless communication device 200 employing the TTL apparatus 400 is shown. Communication device 200 may be, for example, a mobile radiotelephone, base station, and so forth. Communication device includes an antenna 202 for receiving signals and transmitting signals originated by device 200. An RF analog receiver front end 204 demodulates the received signals and provides the baseband signal to an analog-to-digital converter (ADC) 206 and receiver (Rx) filter 208. ADC 206 and Rx filter 208 provide an oversampling for taking N number of samples per PN chip period. The digitized received signals are provided to a rake receiver comprised of a plurality of finger receivers 210, 212, 214, and at least one searcher receiver 216 connected in parallel. The operation of the finger receivers and search receiver is controlled in part by a logic and control circuit 218.

The samples coming out of the Rx filter 208 are processed by the normal peak tracking DLL 209 or threshold tracking loop TTL 400 in accordance with this teaching. A mode control switch 207 switches from TTL 400 to DLL 209 or vice versa based on the command it receives from the logic and control circuitry 218. The operation of TTL 400 is described below by way of reference to FIGS. 4 and 5. The outputs of the finger receivers 210, 212, 214, and search receiver 216 are provided to the logic and control circuit 218 for further processing. Although logic and control circuit 218 is shown as a separate element from the receivers, one skilled in the art will recognize that portions of the logic and control circuit may reside in the receivers.

Logic and control circuit 218 also provides data to transmission circuit path 220, which processes the data and provides the processed data to a digital-to-analog circuit (DAC) 222. The analog signal output by the DAC is provided to an analog RF front end, such as a transmission portion of analog front end 204 for transmission via an antenna such as antenna 202 or other transmission antenna.

Figure 3:
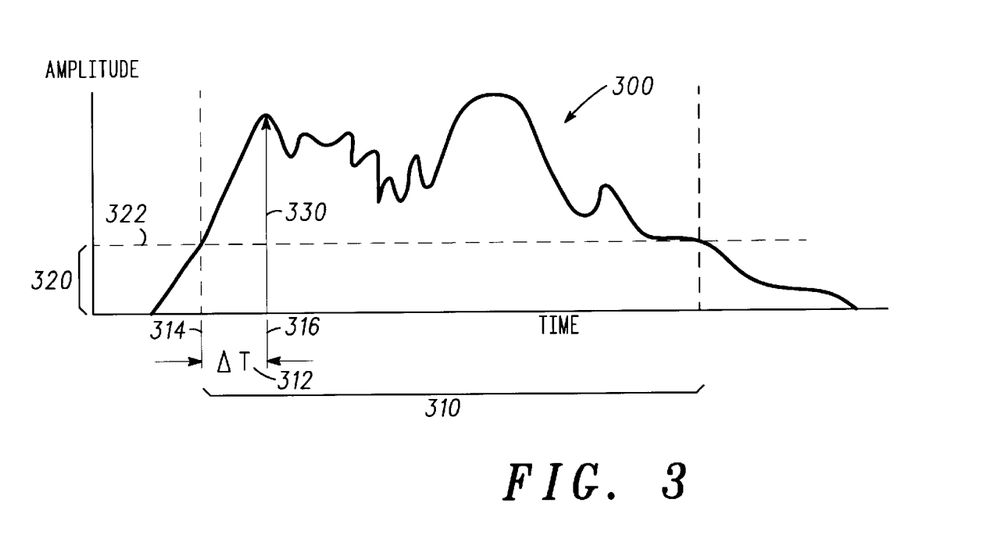
FIG. 3 shows a power delay profile of a CDMA signal.

Referring now to FIG. 3, a power delay profile 300 of a CDMA signal having a delay spread 310 is illustrated. Again, the delay spread is typically about 10–15 $\mu$s. In attempting to determine the TOA of the signal, the first arriving ray is used, which represents the most direct propagation path between base and subscriber unit. Peak amplitude 330 shows the location of a prior art correlation receiver set to receive this first main peak of the power delay profile 300. This prior art method of tracking the center of the energy peak is disadvantageous in that the time of the time of arrival of the peak is not an accurate representation of the true TOA of the signal, i.e., the leading edge of the first arriving ray, which is more representative of the shortest path to the subscriber. The problem increases as the delay profile scattering increases and where signals sent to multiple base stations are affected by different degrees of scattering.

To increase the accuracy of the TOA estimation of the leading edge of the first arriving ray, a threshold energy level 322 is selected. The threshold level is selected by selecting an energy level that is some preselected or predetermined level 320 above the noise floor and less than the energy level of peak 330, e.g., about 3 dB above the noise floor. The TLL circuitry of the base station and/or mobile unit is used to track the threshold energy level until the early and late pilot energy level falls within the predefined threshold. By tracking the threshold level 322, the accuracy of the TOA estimation is improved by time $\Delta T$ (312), which has been found to be about 300–400 ns on average with high signal strength. By providing an improved TOA estimate, the distance between the base station and the mobile unit are more accurately calculated, as are TDOA calculations using the TOA for multiple base stations.

Figure 4:
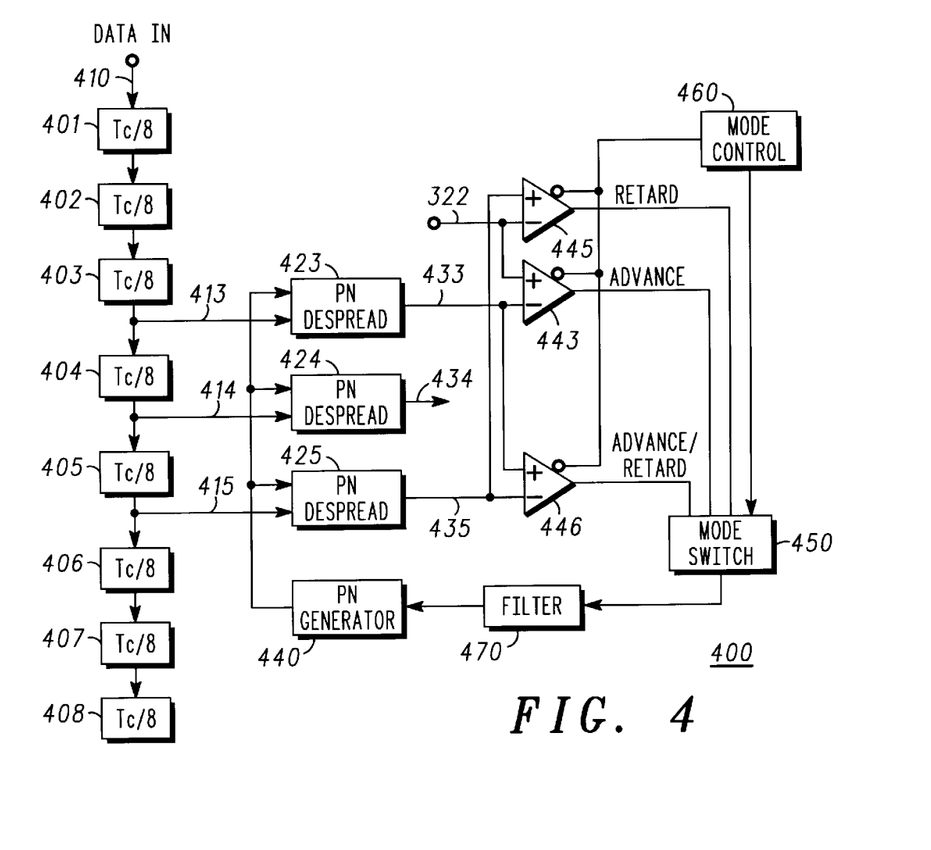
FIG. 4 illustrates a threshold tracking loop (TTL) in accordance with the present invention.

Referring now to FIG. 4, a TTL 400 in accordance with the, present invention includes a series of delay units 401–408 which receive data from the Rx filter 208 (FIG. 2). Again, the TOA estimation in accordance with this teaching can be made by either a mobile unit, in which case the TOA is reflected back to the base station, or, by the base station. The signal data on line 410 is input to a time chain comprising a series of time delay units 401–408. Each delay unit delays the signal by a 1/N of the PN chip clock rate interval, where N is the number of line delay units. Although N=8 in the illustrated embodiment, with each unit delaying the signal by ⅛ of the chip period (Tc/8), other integer values for N are also contemplated, including but not limited to 4, 16, 32, etc.

In location estimation operation, the signal from line 410 is progressively delayed by the line delay units 401–408. The output signal 413 from delay unit 403 is forwarded to PN despreader 423 and the despread early pilot signal 433 is passed on to a comparator circuit 443. Comparator 443 determines whether the energy level of early pilot signal 433 is greater than or less than some threshold value 322. If the early pilot signal 433 is greater than the preselected threshold 322, then the timing is advanced by time Tc/8 by PN generator 440, i.e., the PN generator 440, which is clocked at the chip rate, is delayed by ⅛ of a chip period before driving the early channel.

The output signal 414 signal from delay unit 404 is forwarded to PN despreader 424 and the despread on-time signal 434 is then passed on to deinterleaving and decoding circuitry (not shown).

"The output signal 415 from delay unit 405 is forwarded to PN despreader 425 and the despread late pilot signal 435 is passed on to a comparator circuit 445 and it is determined whether the energy level of late pilot signal 435 is greater than or less than the threshold value 322. If the late pilot signal 435 is less than the preselected threshold 322, then the timing is retarded by time Tc/8 by PN generator 440 by advancing the PN generator by ⅛ of a chip period."

The TTL 400 repeats the process until the early pilot signal 433 is lower than threshold 322 and the late pilot signal 435 is greater than threshold value 322. The time 214 (FIG. 2) at which the leading ray signal energy value reaches the preselected threshold value is employed as the TOA of the signal.

Once the early channel signal is less than the threshold value and the late channel signal is greater than the threshold value, a TOA value can be read from the location of this threshold tracking finger. The threshold tracking loop will repeat this process and constantly adjust itself to ensure that the threshold falls within the early channel signal and late channel signal.

"Once the base station or mobile finishes its TOA measurement, a mode switcher 450 switches the finger operation to peak tracking comparison circuit 446 in order to track, receive, and decode the received transmissions in standard fashion. Mode control circuitry 460 is provided to enable comparators 443 and 445 and disable comparator 446 during threshold tracking in accordance with this teaching, and to enable comparator 446 and disable comparators 443 and 445 during standard peak tracking. The circuit is completed by loop or low pass filter 470 coupled to mode switching circuitry and PN generator 440."

Figure 5:
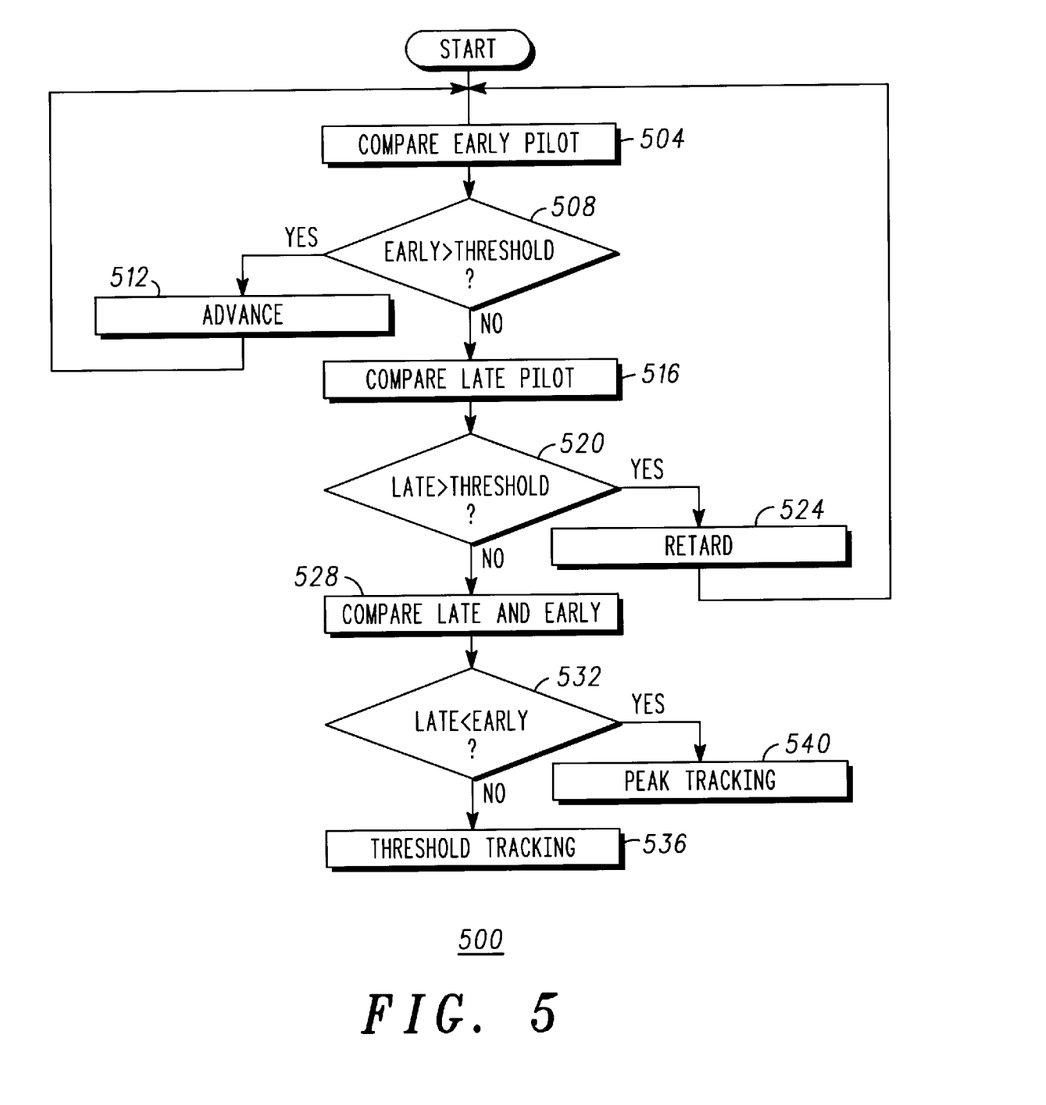
FIG. 5 is a flow diagram outlining a method in accordance with the present invention.

Referring now to FIG. 5, a flow chart outlining an exemplary method 500 of the present invention is illustrated. The process begins in threshold tracking mode, e.g., when it is desired to determine the location of the mobile unit, at step 504 and the energy level of the early pilot is compared with the threshold value. In step 508, if it is determined that the early pilot is greater than the preselected threshold value, the PN timing, or phase code offset, is advanced (step 512) by 1/N of the chip time period (e.g., Tc/8 in the embodiment depicted in FIG. 4), and the process loops back to step 504.

If it is determined at step 508 that the early pilot signal has an energy greater than the threshold value, the process continues to step 516 and the late pilot is compared with the threshold value. If the late pilot energy is greater than the threshold value, the timing is retarded (step 524) by 1/N of the chip time period, and the process loops back to step 504.

If it is determined in step 520 that late pilot energy signal value is less than the threshold value, the process continues to step 532 and the late pilot is compared with the early pilot. If the late pilot energy is greater than the early pilot energy, the process proceeds to step 536 and threshold tracking continues, e.g., the process returns to step 504 and repeats. If it is determined at step 532 that the late energy is less than the early energy, then the process proceeds to step 540 and the mode of finger operation is switched to peak tracking mode for conventional tracking, reception, and decoding of the CDMA signals.

Figure 6:
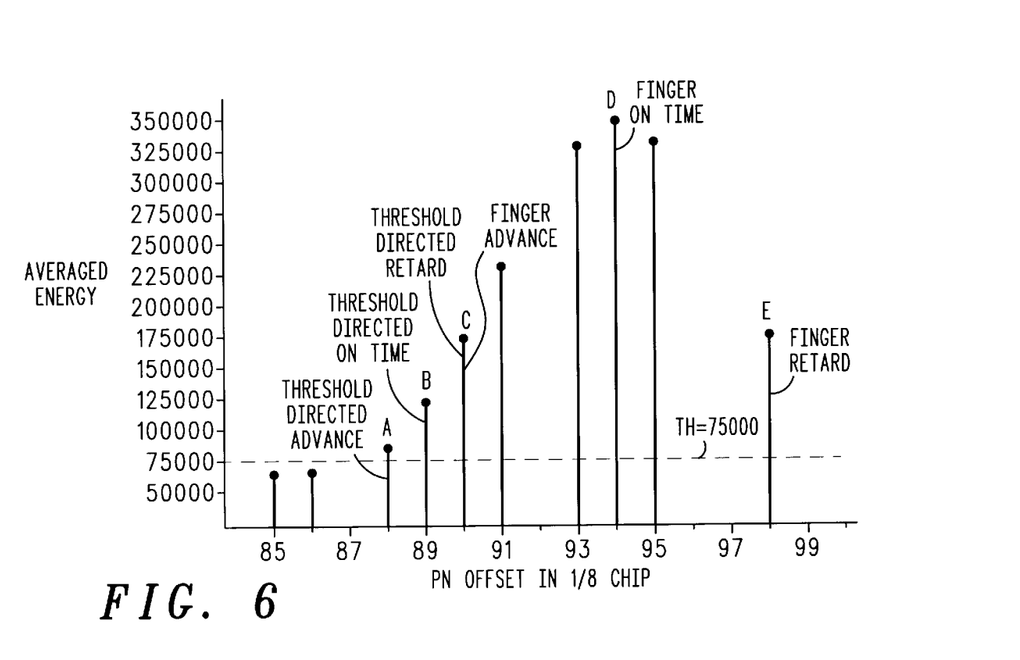
FIGS. 6–8 are graphs depicting the result of computer simulations carried out to verify the performance of the threshold tracking loop apparatus and method of the present invention.
Figure 7:
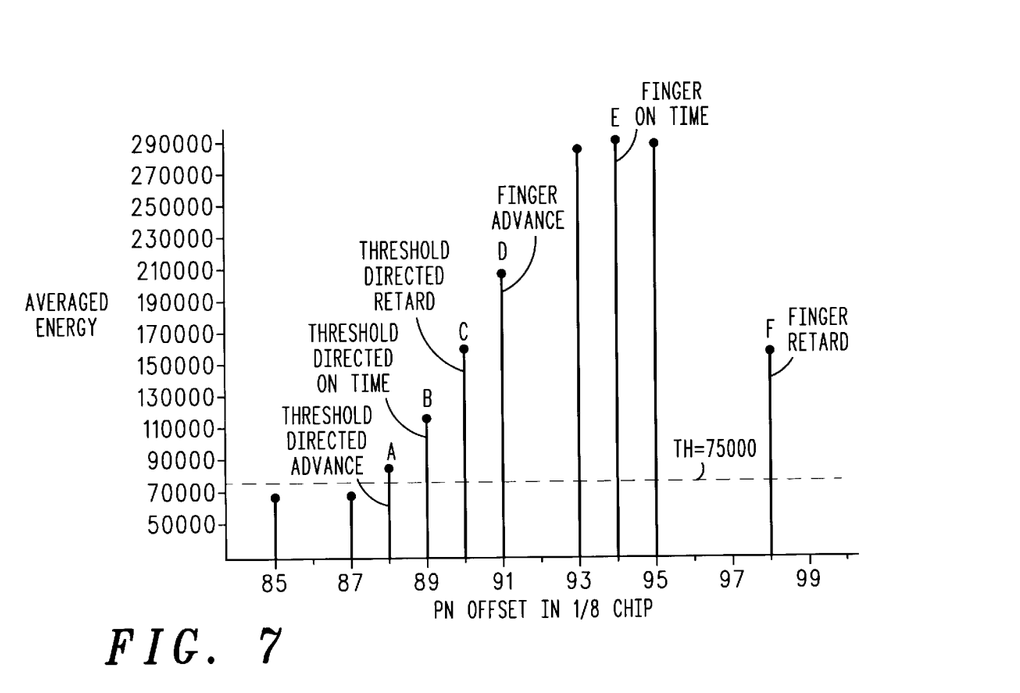
Figure 8:
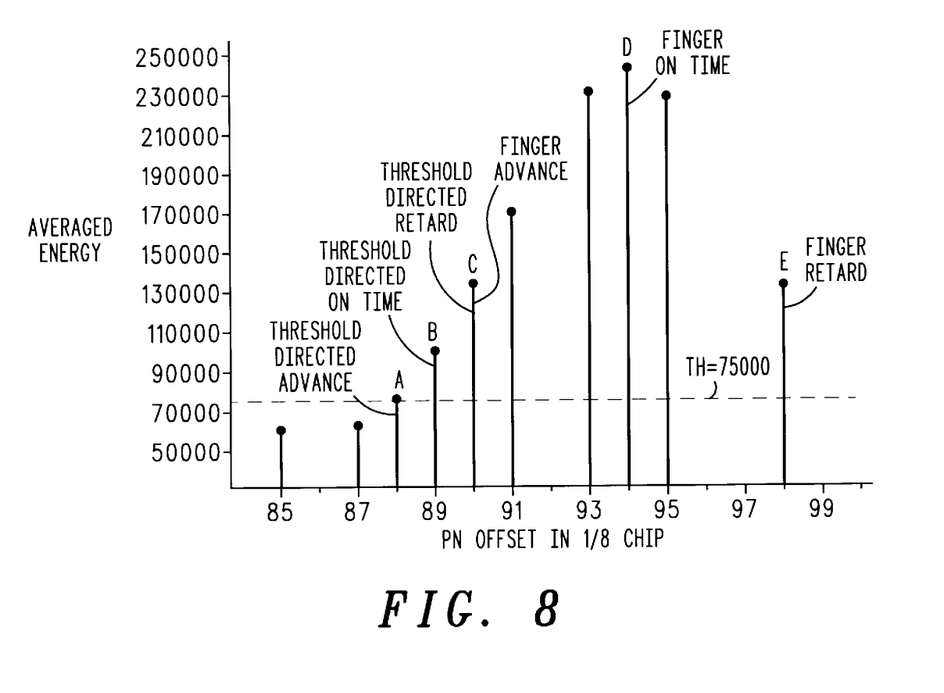

FIGS. 6–8 are graphs depicting the results of computer simulations carried out to verify the performance of the threshold tracking loop method and apparatus of the present invention. FIGS. 6–8 shows the averaged energy value for code phase points of a delay profile.

Referring now to FIGS. 6 and 8, points C, D, and E represent, respectively, early, on-time, and late pilot PN offset for conventional DLL peak tracking. Points A, B, and C represent, respectively, early, on-time, and late pilot PN offset for the threshold tracking loop of the present invention. By comparing points B and D, it can be seen that the time of arrival estimation is improved by ⅝ of a chip period. For current IS-95 based systems, ⅛ of a chip translates to a distance of about 30.5 m, resulting in an accuracy improvement of about 152.5 m over conventional DLL peak tracking.

"Referring to FIG. 7, points D, E, and F represent, respectively, early, on-time, and late pilot PN phase code offset for conventional DLL peak tracking. Points A, B, and C represent, respectively, early, on-time, and late pilot PN offset for the threshold tracking loop of the present invention By comparing points B and E, it can be seen that time of arrival estimation is improved by ⅝ of a chip, thus resulting in an accuracy improvement of about 183 m over conventional DLL peak tracking."

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A threshold tracking loop for detecting the time of arrival of a wireless communication signal comprising:

a pseudo-noise (PN) generator for generating a receive PN code for use in spread spectrum decoding;

a series of time delay units for adjusting a phase offset of the PN code;

a first PN despreader coupled to the time delay units and the PN generator, the first PN despreader for dispreading an early pilot signal;

a second despreader coupled to the time delay units and the PN generator, the second PN despreader for dispreading a late pilot signal;

a first comparison circuit coupled to the first PN despreader for comparing a signal value of the early pilot signal with a preselected threshold value that is less than a peak value of a tracked signal and, in threshold tracking mode, for advancing the PN code phase offset if the early signal value is greater than the threshold value;

a second comparison circuit coupled to the second PN despreader for comparing a signal value of the late pilot signal with the preselected threshold value and, in threshold tracking mode, for retarding the PN code phase offset if the late signal value is less than the threshold value; and mode control circuitry coupled to the first comparison circuit and the second comparison circuit to switch the loop operation between threshold tracking mode and peak tracking mode.

2. The threshold tracking loop of claim 1, further comprising a third comparison circuit for coupled to the first and second despreaders for comparing the early signal value and the late signal value and wherein the mode control circuitry switches the loop operation to a delay locked loop peak tracking mode if the late signal value is less than the early signal value.

3. The threshold tracking loop of claim 1, wherein the spread spectrum communication signal is a Code-Division Multiple Access (CDMA) signal.

4. A wireless communication device comprising a receiver for receiving a modulated spread spectrum signal, the receiver comprising a threshold tracking loop sharing circuitry with a peak tracking loop, the threshold tracking loop comprising:

a pseudo-noise (PN) generator for generating a receive PN code for use in spread spectrum decoding;

a series of time delay units for adjusting a phase offset of the PN code;

a first PN despreader coupled to the time delay units and PN generator, the first PN despreader for dispreading an early pilot signal;

a first comparison circuit coupled to the first PN despreader for comparing a signal value of the early pilot signal with a preselected threshold value that is less than a peak value of a tracked signal and, in threshold tracking mode, for advancing the PN code phase offset if the early signal value is greater than the threshold value;

a second comparison circuit coupled to the second PN despreader for comparing a signal value of the late pilot signal with the preselected threshold value and, in threshold tracking mode, for retarding the PN code phase offset if the late signal value is less than the threshold value; and mode control circuitry coupled to the first comparison circuit and the second comparison circuit to switch the loop operation between threshold tracking mode and peak tracking mode.

5. A location system for calculating the distance of a mobile communication device from a base station, the mobile device comprising a transceiver for transmitting a signal to the base station and receiving a signal from the base station, the location system comprising:

a base station comprising a transceiver for transmitting a signal to the mobile device and receiving a signal from the mobile device;

threshold tracking loop circuitry sharing circuitry with peak tracking loop circuitry and coupled to at least one of the base station transceiver and the mobile device transceiver, the threshold tracking loop circuitry comprising:

a pseudo-noise (PN) generator for generating a receive PN code for use in spread spectrum decoding;

a series of time delay units for adjusting a phase offset of the PN code;

a first PN despreader coupled to the time delay units and PN generator, the first PN despreader for dispreading an early pilot signal;

a second despreader coupled to the time delay units and PN generator, the second PN despreader for dispreading a late pilot signal;

a first comparison circuit coupled to the first PN despreader for comparing a signal value of the early pilot signal with a preselected threshold value that is less than a peak value of a tracked signal and, in threshold tracking mode, for advancing the PN code phase offset if the e early signal value is greater than the threshold value;

a second comparison circuit coupled to the second PN despreader for comparing a signal value of the late pilot signal with the preselected threshold value and, in threshold tracking mode, for retarding the PN code phase offset if the late signal value is less than the threshold value; and mode control circuitry coupled to the first comparison circuit and the second comparison circuit to switch the loop operation between threshold tracking mode and peak tracking mode.

6. A method for estimating the time of arrival of a spread spectrum communication signal, comprising:

(a) receiving a spread spectrum signal;

(b) at a fractional chip of PN code phase offset of a pseudo-noise (PN) generator for generating a PN code for use in spread spectrum decoding, sampling signal values for an early pilot signal and a late pilot signal relative to a nominal phase of the signal (c) comparing the early signal value with a preselected threshold value;

(d) if the early signal value is less than the threshold value, comparing the late signal value with the threshold value;

(e) if the late signal value is less than the threshold value, retarding the PN code phase offset;

(f) if the late signal value is less than the threshold value, retarding the PN code phase offset;

(g) if the late signal value is greater than the threshold, comparing the early signal value and the late signal value;

(h) if the late signal value is greater than the early signal value, repeating steps (a)–(h) to maintain threshold tracking; and (i) estimating a receive time based on the threshold tracking.

7. The method of claim 6, further comprising:

if The late signal value is less than the early signal value, tracking a peak signal value of the spread spectrum signal.

8. The method of claim 6, wherein the PN code phase offset is 1/N chip relative to nominal phase, where N is an integer.

9. The method of claim 6, wherein the PN code phase offset is ⅛ chip relative to nominal phase.

10. The method of claim 6, wherein the spread spectrum communication signal is a Code-Division Multiple Access (CDMA) signal.

11. A wireless communication device for threshold directed tracking of a spread spectrum communication signal, comprising a receiver for receiving a modulated spread spectrum signal, the receiver:
(a) receiving a spread spectrum signal;
(b) sampling, at a fractional chip of PN code phase offset of a pseudo-noise (PN) generator for generating a PN code for use in spread spectrum decoding, signal values for an early pilot signal and a late pilot signal relative to a nominal phase of the signal;
(c) comparing the early signal value with a preselected threshold value;
(d) if the early signal value is less than the threshold value, comparing the 1 late signal value with the threshold value;
(e) if the late signal value is less than the threshold value, retarding the PN code phase offset;
(f) if the late signal value is less than the threshold value, retarding the PN code phase offset;
(g) if the late signal value is greater than the threshold, comparing the early signal value and the late signal value;
(h) if the late signal value is greater than the early signal value, repeating steps (a)–(h) to maintain threshold tracking.

12. A wireless communication system, comprising:
a plurality of base stations in communication with a mobile device, the base stations receiving a signal from the mobile unit and transmitting a signal to the mobile unit, the signals being formed via modulation by a sequence of spreading symbols, each of the base stations comprising a threshold tracking loop sharing circuitry with a peak tracking loop for estimating the time of arrival of a signal, each of the threshold tracking loops comprising:
a pseudo-noise (PN) generator for generating a receive PN code for use in spread spectrum decoding;
a series of time delay units for adjusting a phase offset of the PN code;
a first PN despreader coupled to the time delay units and PN generator, the first PN despreader for dispreading an early pilot signal;
a first comparison circuit coupled to the first PN despreader for comparing a signal value of the early pilot signal with a preselected threshold value that is less than a peak value of a tracked signal and, in threshold tracking mode, for advancing the PN code phase offset if the early signal value is greater than the threshold value;
a second comparison circuit coupled to the second PN despreader for comparing a signal value of the late pilot signal with the preselected threshold value and, in threshold tracking mode, for retarding the PN code phase offset if the late signal value is less than the threshold value;
mode control circuitry coupled to the first comparison circuit and the second comparison circuit to switch the loop operation between threshold tracking mode and peak tracking mode; and
a location estimate calculator coupled to each of the base stations, the location estimate calculator determining an estimated location of the mobile unite using estimated time of arrivals from each of the base stations.

13. The wireless communication system of claim 12, comprising at least three base stations in communication with a mobile device.

14. The communication system of claim 12, wherein each of the threshold tracking loops further comprises a third comparison circuit for coupled to the first and second despreaders for comparing the early signal value and the late signal value and for switching to a delay locked loop peak tracking mode if the late signal value is less than the early signal value.

15. The communication system of claim 12, wherein the spread spectrum communication signal is a Code-Division Multiple Access (CDMA) signal.

16. A wireless communication system comprising:
a mobile unit in communication with a plurality of base stations, the mobile unit receiving a signal from the base stations and transmitting a signal to the base stations, the signals being formed via modulation by a sequence of spreading symbols, the mobile unit comprising a threshold tracking loop for estimating the time of arrival of a signal, the threshold tracking loop comprising:
a pseudo-noise (PN) generator for generating a receive PN code for use in spread spectrum decoding;
a series of time delay units for adjusting a phase offset of the PN code;
a first PN despreader coupled to the time delay units and PN generator, the first PN despreader for dispreading an early pilot signal;
a first comparison circuit coupled to the first PN despreader for comparing a signal value of the early pilot signal with a preselected threshold value value that is less than a peak value of a tracked signal and, in threshold tracking mode, for advancing the PN code phase offset if the early signal value is greater than the threshold value;
a second comparison circuit coupled to the second PN despreader for comparing a signal value of the late pilot signal with the preselected threshold value and, in threshold tracking mode, for retarding the PN code phase offset if the late signal value is less than the threshold value; and
mode control circuitry coupled to the first comparison circuit and the second comparison circuit to switch the loop operation between threshold tracking mode and peak tracking mode; and
a location estimate calculator coupled to each of the base stations, the location estimate calculator determining an estimated location of the mobile unit using estimated time of arrivals from each of the base stations.

17. The wireless communication system of claim 16, comprising at least three base stations in communication with a mobile device.

18. The communication system of claim 16, wherein each of the threshold tracking loops further comprises a third comparison circuit for coupled to the first and second despreaders for comparing the early signal value and the late signal value and for switching to a delay locked loop peak tracking mode if the late signal value is less than the early signal value.

19. The communication system of claim 16, wherein the spread spectrum communication signal is a Code-Division Multiple Access (CDMA) signal.

20. The wireless communication device of claim 4, wherein the threshold tracking loop further comprises a third comparison circuit coupled to the first and second despreaders for comparing the early signal value and the late signal value and wherein the mode control circuitry switches the threshold tracking loop to a delay locked loop peak tracking mode if the late signal value is less than the early signal value.

21. The location system of claim 5, wherein the threshold tracking loop circuitry further comprises a third comparison circuit coupled to the first and second despreaders for comparing the early signal value and the late signal value and wherein the mode control circuitry switches the threshold tracking loop to a delay locked loop peak tracking mode if the late signal value is less than the early signal value.

* * * * *